(12) United States Patent
Sardella et al.

(10) Patent No.: US 7,822,895 B1
(45) Date of Patent: Oct. 26, 2010

(54) SCALABLE CPU (CENTRAL PROCESSING UNIT) MODULES FOR ENABLING IN-PLACE UPGRADES OF ELECTRONICS SYSTEMS

(75) Inventors: Steven D. Sardella, Hudson, MA (US); Kenneth Sullivan, Hudson, MA (US); Brandon Barney, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 114 days.

(21) Appl. No.: 11/965,914

(22) Filed: Dec. 28, 2007

(51) Int. Cl.
*G06F 13/00* (2006.01)
(52) U.S. Cl. .......................................... 710/104; 714/3
(58) Field of Classification Search .................. 710/62, 710/104; 709/201; 714/1, 3; 711/153
See application file for complete search history.

(56) References Cited

U.S. PATENT DOCUMENTS

| | | | |
|---|---|---|---|
| 2003/0041233 A1* | 2/2003 | Su et al. | 713/1 |
| 2008/0120518 A1* | 5/2008 | Ritz et al. | 714/3 |
| 2008/0313369 A1* | 12/2008 | Verdoorn et al. | 710/62 |

* cited by examiner

*Primary Examiner*—Clifford H Knoll
(74) *Attorney, Agent, or Firm*—Guerin & Rodriguez, LLP; Michael Rodriguez (57) ABSTRACT

Described is an electronics enclosure having a midplane, a first field-replaceable CPU (central processing unit) module, and a second field-replaceable CPU module. Each CPU module is independently pluggable into and removable from the midplane. Each CPU module is configurable into either one of a first configuration and a second configuration, wherein the CPU modules operate independently as separate CPU modules when configured according to the first configuration and cooperate as a unitary CPU module when configured according to the second configuration.

18 Claims, 6 Drawing Sheets

SCALABLE CPU (CENTRAL PROCESSING UNIT) MODULES FOR ENABLING IN-PLACE UPGRADES OF ELECTRONICS SYSTEMS

FIELD OF THE INVENTION

The present invention relates generally to electronics systems. More particularly, the present invention relates to a "building block" central processing unit (CPU) module that enables in situ upgrades of low-end and midrange electronics systems to high-end electronics systems.

BACKGROUND

Enterprises often offer families of electronics products ranging from low-end (or midrange) systems to high-end systems. In general, low-end and midrange systems provide less performance than do their high-end counterparts, particularly because such systems typically have less memory, fewer processors, and fewer I/O (input/output) expansion capabilities. Accordingly, low-end and midrange systems generally cost less than their high-end counterparts cost and, therefore, usually serve as entry-level systems. Customers, however, often outgrow the performance of their entry-level systems and seek to upgrade.

To offer a range of products, enterprises usually have different product designs: entry-level and high-end systems regularly have different processors, core logic chip sets, types of memory, memory speed, and system enclosures. These various differences typically impede in situ and non-disruptive upgrades from an entry-level system to a high-end system. To perform a system upgrade, customers generally need to remove and replace the existing enclosure (i.e., the entry-level system) with a new enclosure (i.e., the high-end system). This removal and replacement of the entry-level system invariably causes downtime to the customers' operations because during the replacement there can be no access to the data stored in the I/O modules.

SUMMARY

In one aspect, the invention features a method for performing an upgrade to an electronics system. The electronics system comprises an electronics enclosure with a midplane having two CPU modules removably connected thereto. The method comprises configuring the CPU modules of the electronics enclosure to operate according to a first configuration in which each CPU module operates independently as a separate CPU module when communicating with I/O modules in the electronics enclosure. Each CPU module is reconfigured in situ within the electronics enclosure to operate according to a second configuration in which the CPU modules work together as a unitary CPU module when communicating with the I/O modules in the electronics enclosure.

In another aspect, the invention features an electronics enclosure comprising I/O (input/output) modules, a midplane, and first and second field-replaceable CPU (central processing unit) modules in communication with the I/O modules through the midplane. Each CPU module is independently pluggable into and removable from the midplane. Each CPU module is configurable into either one of a first configuration and a second configuration, wherein the CPU modules operate independently as separate CPU modules when configured according to the first configuration and cooperate as a unitary CPU module when configured according to the second configuration.

In still another aspect, the invention features a logic chipset comprising a processor having a processing core in communication with a memory controller hub (MCH) device. The MCH device has a port for communicating with an MCH device of another processor over differential signal pairs in accordance with a serial interconnect protocol. The MCH device disables communications through the port when configured according to a first configuration and enables communications through the port when configured according to a second configuration.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

A "building block" CPU module, as described herein, provides a means by which customers can perform in situ and, in some embodiments, non-disruptive upgrades to their electronics systems. In one embodiment, this building block CPU module includes one processor, a fixed number of memory slots, and a fixed amount of I/O connectivity, which, for example, can be measured in the number of lanes of PCI Express. Entry-level systems (i.e., low-end and midrange systems) can have, within a single electronics enclosure, two such uni-processor (UP) CPU modules, each CPU module being configured to operate independently of the other, for example, as independent storage processors or blades. To upgrade such an entry-level system to a high-end system, personnel can reconfigure the CPU modules, in situ, to operate together as a unitary dual-processor (DP) CPU module, without requiring the removal or replacement of the UP CPU modules in the electronics enclosure.

Within an electronics enclosure, these building block CPU modules removably plug into a midplane (or a backplane). This midplane provides external connections (i.e., a serialized bus) between the UP CPU modules by which the CPU modules can communicate using low-voltage differential signaling. Serialized low-voltage differential signaling, with its high noise immunity in comparison to parallel signaling, enables communications through electrical connectors and over external connections, such as those on a midplane, thereby enabling the UP CPU modules to cooperate as a single DP module when so configured.

In addition, a field upgrade from a DP CPU module entry-level system to a DP (or greater) CPU module high-end system can be achieved by adding one or more electronics enclosures (each housing a DP CPU module) to the equipment rack holding the entry-level system, rather than disruptively swapping out disparate CPU modules or enclosures in order to achieve the upgrade.

Figure 1:
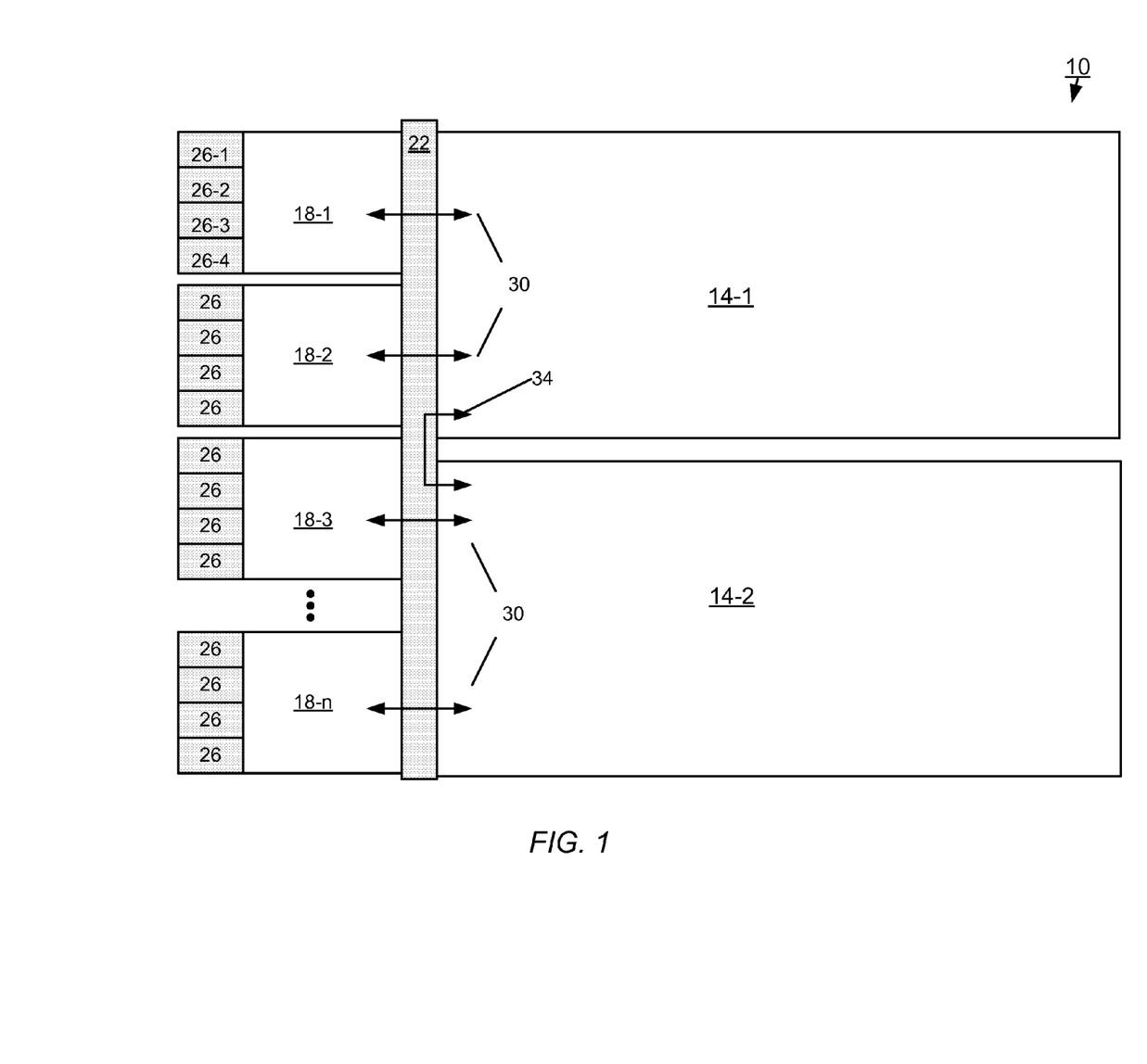
FIG. 1 is a functional block diagram of an embodiment of an electronics enclosure having a pair of CPU modules constructed in accordance with the invention.

FIG. 1 shows a simplified embodiment of an electronics enclosure 10, for example, a data storage array or a blade server, constructed in accordance with the invention. The electronics enclosure 10 includes a plurality of CPU (central processing unit) modules 14-1, 14-2 (generally, 14) in communication with a plurality of I/O modules 18-1, 18-2, 18-3, and 18-n (generally, 18) through a midplane 22. The CPU modules 14 are hot-pluggable, field-replaceable or customer-replaceable units (FRUs or CRUs). In general, a FRU is a circuit board, subassembly, or subsystem that a customer or field-service technician can quickly and easily remove and replace within an electronics enclosure, often at the customer site. In different types of electronics systems, CPU modules 14 may be referred to by different descriptors, such as storage processors, data movers, server blades, or simply blades.

Generally, the midplane 22 is mechanically fixed within the electronics enclosure 10 (i.e., not a FRU), which can make it labor-intensive to remove (and may require sending the entire electronics enclosure to the equipment manufacturer for service, rather than service in the field).

Similar to the CPU modules, 14, the I/O modules 18 are hot-pluggable FRUs. Examples of types of I/O modules 18 include, but are not limited to, Fiber Channel, iSCSI (Internet SCSI), FICON (Fiber Connectivity), SAS (serial attached SCSI), Infiniband, and Ethernet (10/100/1000 Base-T). Each I/O module 18 has a plurality of I/O ports 26. Here, as a representative example, the I/O module 18-1 has four I/O ports 26-1, 26-2, 26-3 and 26-4 (generally, 26). Other portions of the electronics enclosure 10, such as fans, power supply units, and housing, are not shown to simplify the illustration.

Each CPU module 14 is electrically connected to a subset of the I/O modules 18 over sets of differential signal pairs 30—which may also be referred to as lanes—that pass through the midplane 22. Here, for example, CPU module 14-1 is in communication with I/O modules 18-1 and 18-2; CPU module 14-2 is in communication with I/O modules 18-3 and 18-n. Each CPU module 14 communicates with its corresponding subset of I/O modules 18 over the differential signal pairs 30 in accordance with a serialized point-to-point interconnect protocol, for example, PCI Express™.

The midplane 22 also has electrical connections 34 for providing sets of differential signal pairs by which the CPU modules 14 may communicate with each other. Whether the CPU modules 14 use the electrical connections 34 to communicate depends upon the particular configuration of the CPU modules 14, as described in more detail below.

In brief overview, the CPU modules 14 each operate independently (e.g., as a separate blade or storage processor) when operating in accordance with a first configuration, and work together as a unitary—having the indivisible character of a unit—CPU module when operating in accordance with a second configuration.

When the CPU modules 14 are configured according to the first configuration, the electronics enclosure 10 has two separate blades (or storage processors), each having access limited to its subset of the I/O modules in the enclosure. When operating in the first configuration, each CPU module 14-1, 14-2 is individually and separately serviceable; in the event one of the CPU modules faults, the customer or field-service personnel may remove it while the other CPU module continues to operate. Although access to the subset of I/O modules 18 that is in communication with the faulting CPU module is temporarily lost, the electronics enclosure 10 continues to provide access to the other subset of I/O modules 18 through the working CPU module. This first configuration, in general, can be used to produce an entry-level electronics system.

Reconfiguring these CPU modules 14 to operate in the second configuration, by executing a software utility as described below, effectively upgrades the electronics system from the entry-level electronics system to a high-end electronics system. When the CPU modules 14 are configured according to the second configuration, the electronics enclosure 10 has one unitary CPU module (e.g., one blade or one storage processor) with access to all of the I/O modules (i.e., either CPU module has access to any of the I/O modules). Although each CPU module 14-1, 14-2 is individually and separately removable, in the event one of the CPU modules faults, the unitary CPU module faults and needs servicing by the customer or field-service personnel in its entirety.

Figure 2:
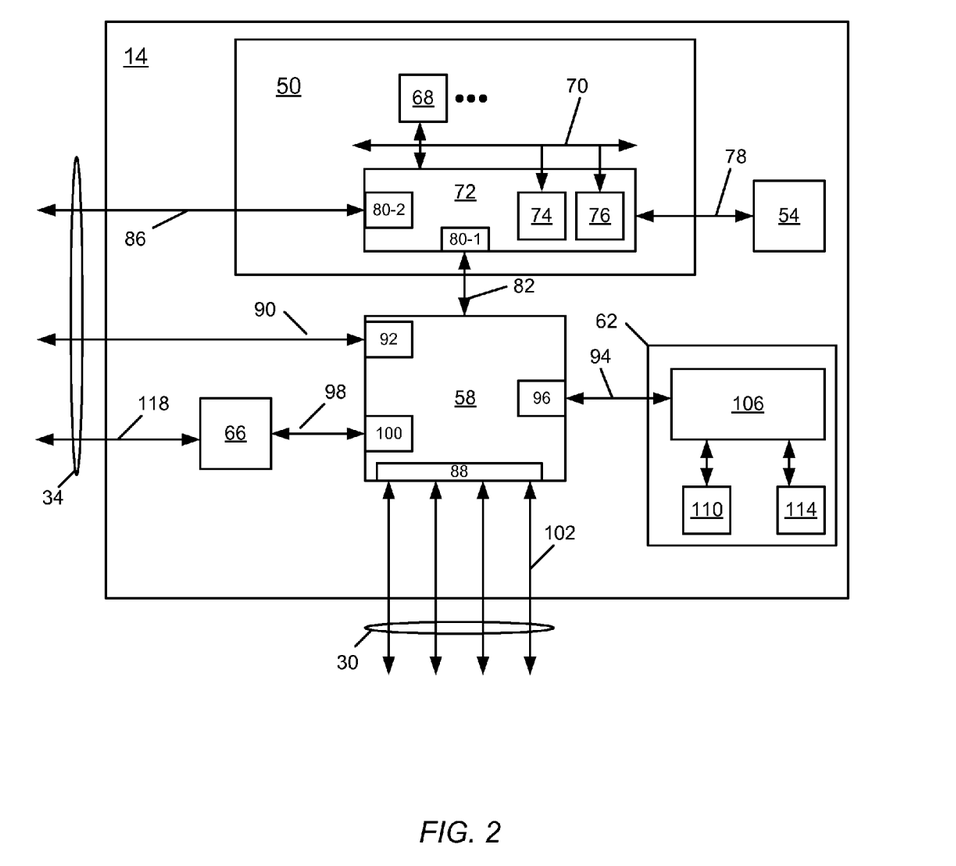
FIG. 2 is a functional block diagram of an embodiment of a CPU module for use in the electronics enclosure of FIG. 1.

FIG. 2 shows an embodiment of a "building block" CPU module 14 having one processor 50, memory 54, an input/output hub (IOH) device 58, logic 62, and a protocol bridge 66. CPU modules having one processor are referred to as uni-processor (UP) CPU modules; those having two processors are dual-processor (DP) CPU modules; and those having more than two processors are multi-processor (MP) CPU modules.

As a building block, the CPU module 14 is the fundamental processing unit from which entry-level and high-end electronics systems are constructed. Entry-level and high-end electronics systems generally have two or more of such CPU modules 14 (although a low-end electronics system may have only one CPU module), with each CPU module 14 having the same architecture; it is the particular configuration of the CPU modules that determines whether a given electronics system is entry-level or high-end.

In this embodiment, the processor 50 has one or more processing cores 68. Each processing core 68 is in communication with a memory controller hub (MCH) 72—also referred to as a northbridge—over a system bus 70. In one embodiment, the MCH 72 includes means for persistently storing configuration flags, examples of which include persistent registers 74 and strapping bits 76. A persistent bit maintains its value through a reset (where power is maintained) and through power-cycles. Accordingly, data stored in a persistent register 74 and in the strapping bits 72 persist unchanged after a reset or after a power cycle of the MCH 72. Strapping bits 76 are used to configure the MCH 72 when the MCH 72 "recovers" from a reset or a power cycle. In another embodiment, the persistent registers 74 and/or strapping bits 72 are located in the peripheral logic 62. This persistent functionality can be achieved by locating the bits in a battery-backed register or in FLASH memory (as an example). In other embodiments, a "sticky" register may be used to store configuration information. Sticky means that a bit maintains its value through a reset, but not through a power cycle.

Bit values stored in certain registers 74 and/or strapping bits 76 can be used to determine and direct the configuration of the CPU module 14 (i.e., first configuration or second configuration). Through software control of these stored bit values, the configuration of the CPU module 14 can be initially established and subsequently changed in situ (which settings take effect after the MCH device 72 recovers from a reset or a power cycle).

The MCH 72 is in communication with the memory 54 over a memory bus 78. The memory 54, in one embodiment, is implemented with DDR SDRAM (double data rate synchronous dynamic random access memory) memory modules. In addition, the MCH 72 has a first port 80-1 for communicating with the IOH device 58 over differential signal pairs or lanes 82 and a second port 80-2 for communicating over differential signal pairs or lanes 86 (which connect the processor 50 to electrical connections 34 of the midplane 22). In general, a port is logically an interface between a device (or component) and a link (a set of differential signal pairs or lanes) and, physically, a group of collocated transmitters and receivers that define a link.

To transmit data serially over the differential signal pairs 82, 86, the MCH 72 can use one of a variety of chip-to-chip serialized interconnect technologies. Typically, the interconnect technology used is proprietary to the particular MCH chip or chipset, for example, HyperTransport™ and Common System Interconnect (CSI). Notwithstanding, PCI Express™ can be used without departing from the principles of the invention.

The IOH device 58 provides a communication interface between the processor 50 and the I/O modules 18. The IOH device 58 uses a serialized chip-to-chip interconnect technology, for example, PCI Express™, to communicate with I/O modules 18 over differential signal pairs or lanes 102, converting between the interconnect technology used by the MCH 72 (if different) and the interconnect technology used to communicate with the I/O modules 18. The differential signal pairs 102 electrically connect the ports 88 to electrical connections 30 of the midplane 22. Differential signal pairs or lanes 90 connect port 92 of the IOH device 58 to electrical connections 34 of the midplane 22. To transmit data serially over the differential signal pairs 90, the IOH device 58 uses a chip-to-chip serialized interconnect technologies, for example, HyperTransport™ and Common System Interconnect (CSI) (excluding PCI Express™ to avoid an illegal connection of two downstream transparent PCI Express™ ports). Typically, the lanes 90 employ the same serialized interconnect technology, such as HyperTransport™ and CSI, as the lanes 86 (for processor-to-processor connections) and the lanes 82 (for processor-to-IOH device connections).

In addition, port 96 of the IOH device 58 is in communication with the logic 62 over signal lines 94 and port 100 of the IOH device 58 is in communication with the protocol bridge 66 over differential signal pairs 98 (PCI Express™).

The logic 62 includes an I/O Controller Hub (ICH) 106, also known as a southbridge, which is in communication with a Super I/O (SIO) device 110 for integrating various I/O functionality on the CPU module 14 and with persistent memory (e.g., PROM, FLASH) 114. The logic 62 may also include "glue" logic (e.g., for achieving compatibility with a Windows™ operating system). The logic 62 is hereafter referred to generally as peripheral logic 62 to encompass the various specialist functions performed by such logic. "Peripheral", as used in this context, is not intended to imply that such logic is situated externally to the CPU module or limited to input/output functionality, rather to contrast such logic with the core logic of the CPU module that handles the communications between processors 50, IOH devices 58, and the I/O modules 18). For example, the persistent memory 114 contains program code that implements the BIOS (basic input-output operating system) and POST (power-on self-test) routines for the CPU module 14.

The protocol bridge 66 includes a non-transparent port for enabling peer-to-peer communication between two CPU modules 14 connected to the midplane 22. Differential signal pairs 118 electrically couple the non-transparent port of the protocol bridge 66 to electrical connections 34 of the midplane 22. The non-transparent bridging performed by the bridge 66 provides the needed isolation between CPU modules 14 for peer-to-peer communication. A PEX 8524 PCI Express™ switch, manufactured by PLX Technology of Sunnyvale, Calif. can be used to implement the bridge 66. The bridge 66 and differential signal pairs 118 can be used to provide, for example, a communication manager interface (CMI) path by which each CPU module is able to mirror data cached by the other CPU module.

In one embodiment, the IOH unit 58, peripheral logic 62, and protocol bridge 66 are implemented on an interconnect module (not shown) interposed between the midplane 22 and the I/O modules 18. The use of an interconnect module is described in more detail in U.S. patent application Ser. No. 11/965,841, filed on Dec. 28, 2007, the entirety of which is incorporated by reference herein.

Figure 3:
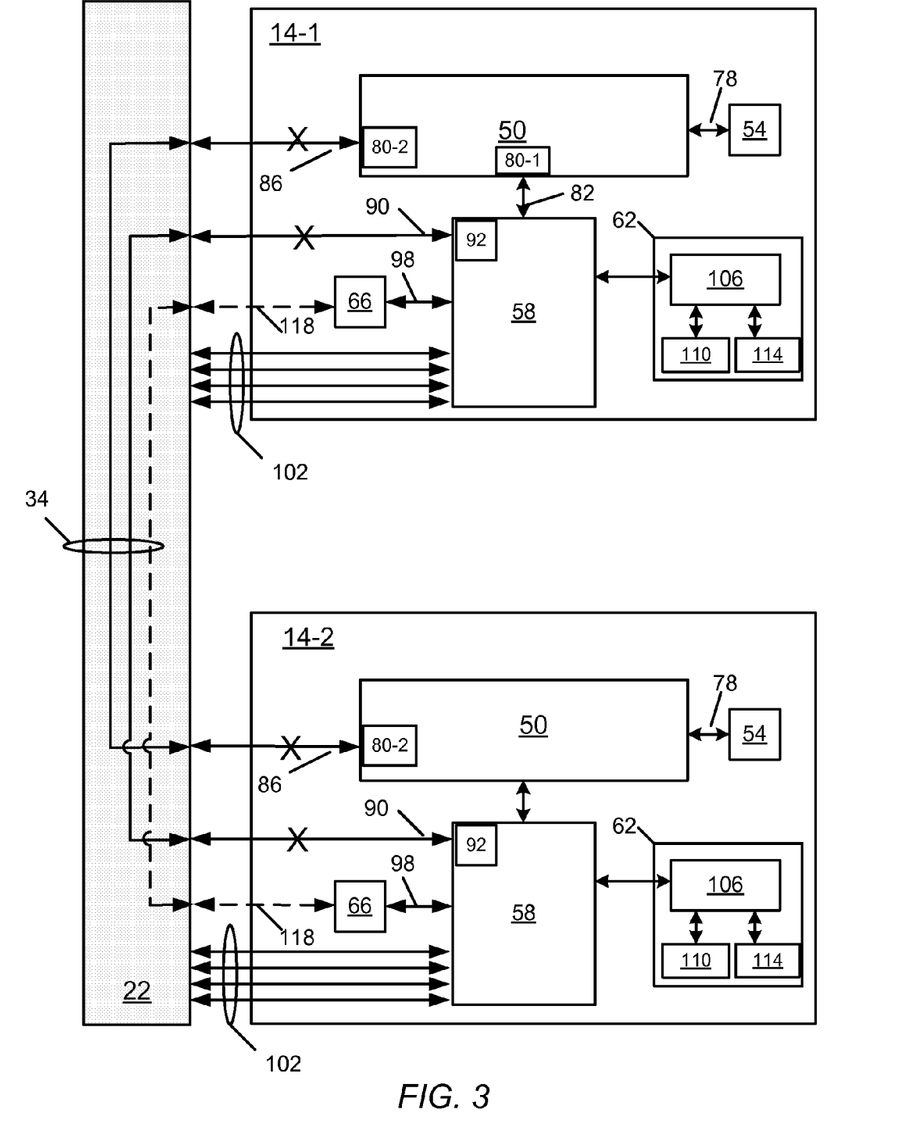
FIG. 3 is a functional block diagram of a first configuration of the CPU modules of the electronics enclosure of FIG. 1.

FIG. 3 illustrates the first configuration in which each of the two UP CPU modules 14-1, 14-2 operates independently as a separate CPU module 14. In the first configuration, communications between CPU modules 14-1, 14-2 over differential signal pairs 82, 90 are disabled or deactivated, signified by the "X"—although the physical electrical connections are still present on the CPU modules and on the midplane 22. Disabling communications over differential signal pairs 82, 90, in effect, hides the processors 50 and IOH devices 58 on different CPU modules from each other; thus, the processors 50 of the CPU modules 14 cannot communicate directly with each other and the IOH devices 58 of the CPU modules 14 do not communicate directly with each other. Notwithstanding the disabling or deactivation of processor-to-processor and IOH-to-IOH communications, in one embodiment, illustrated with dashed lines, peer-to-peer communications between the CPU modules 14-1, 14-2 may occur over the differential signal pairs 118 (e.g., over a CMI path).

The disabling of the processor-to-processor and IOH-to-IOH communications can occur as a default configuration when the CPU modules 14-1, 14-2 "awaken" or "recover" from a reset or a power cycle (generally referred to as a start-up). Upon start-up, each CPU module 14-1, 14-2 executes its BIOS and POST routines (stored in persistent memory 114 of the peripheral logic 62). Execution of such program code establishes that the CPU module is configured presently as a UP CPU module (i.e., the first configuration). To determine the present configuration, the program code accesses the persistent memory storing one or more configuration flags (i.e., registers 74 and/or strapping bits 76). In response to this determination, each CPU module 14-1, 14-2 disables certain interfaces (i.e., ports 80-2, 92 of FIG. 2) and becomes operational as an individually operating CPU module with data access to a subset of the I/O modules 18 in the electronics enclosure 10.

Figure 4:
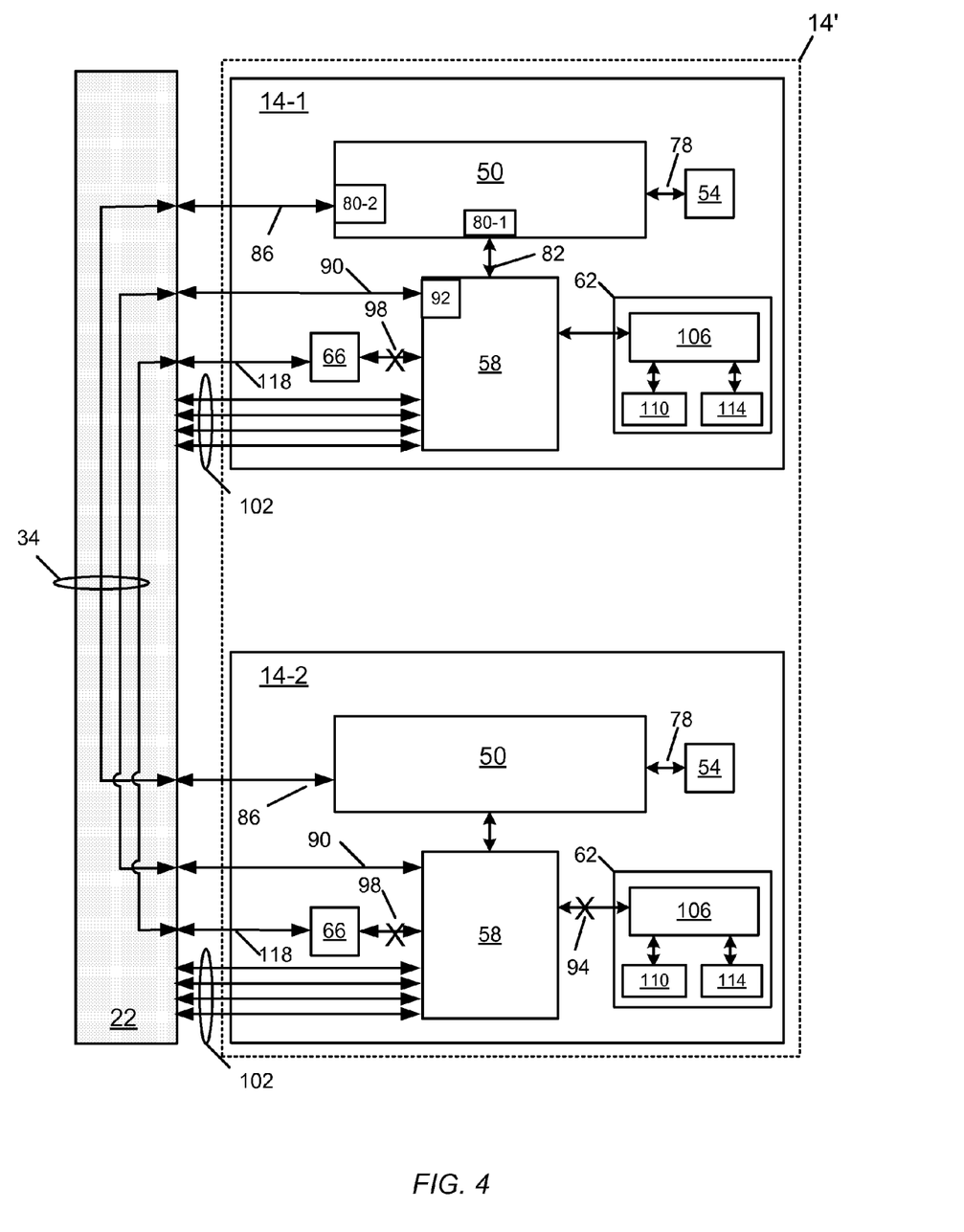
FIG. 4 is a functional block diagram of a second configuration of the CPU modules of the electronics enclosure of FIG. 1.

FIG. 4 illustrates the second configuration in which the two UP CPU modules 14-1, 14-2 cooperate to perform as a unitary DP CPU module 14'. When the CPU modules 14-1, 14-2 operate according to this configuration, communications between the processors 50 and between the IOH devices 58 of the two CPU modules 14-1, 14-2 are enabled (or activated). That is, processors 50 communicate with each other over the midplane 22 using differential signal pairs 86 and IOH devices 58 communicate with each other over the midplane 22 using differential signal pairs 90. In addition, for embodiments in which the entry-level system employed a CMI path, each CPU module 14-1, 14-2 disables (or deactivates) the interface (i.e., port 100) between the IOH device 58 and the protocol bridge 66 associated with differential signal pairs 98—signified by an "X" (although the physical electrical connections are still present).

Further, because the two UP CPU modules 14-1, 14-2 are configured to operate as a unitary DP CPU module 14', the CPU modules 14-1, 14-2 do not independently recover after a reset or power cycle. One of the CPU modules executes its start-up BIOS and POST program code stored in its persistent memory 114, whereas the other CPU module does not (in contrast to the first configuration, in which both CPU modules start up from their own BIOS and POST routines). This operation occurs as such because the utility software used to reconfigure the CPU modules in the second configuration sets a particular bit in the persistent registers 74 (or in one or more designated strapping bits 76) to indicate that the interface between the IOH device 58 and the peripheral logic 62 is disabled or deactivated. For example, in FIG. 4, the CPU module 14-2 does not execute its start-up code. To signify this deactivation or disabling, the electrical communication path 94 between the IOH device 58 of CPU module 14-2 and the peripheral logic 62 is represented with an "X".

Figure 5:
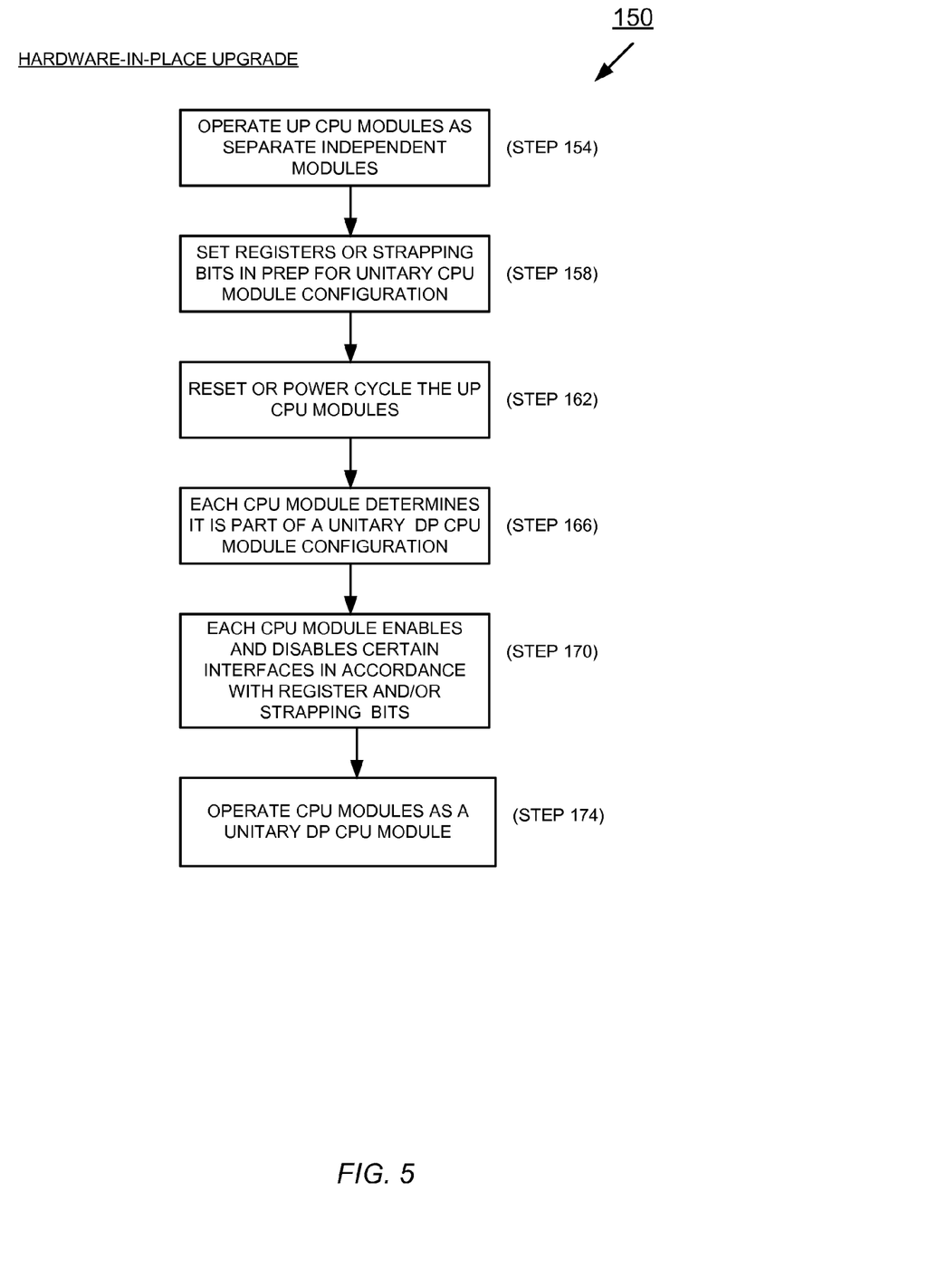
FIG. 5 is a flow diagram of an embodiment of a process for performing a "hardware-in-place" upgrade of an electronics system in accordance with the invention.

FIG. 5 shows an embodiment of a process 150 for performing a "hardware-in-place" or in situ upgrade of an electronics enclosure in accordance with the principles of the invention. At step 154, the electronics enclosure operates according to the first configuration described in FIG. 3: the electronics enclosure has two UP CPU modules 14-1, 14-2, each functioning independently as a separate, independent CPU module. At step 158, a customer or field-service personnel executes a software utility program on both CPU modules 14-1, 14-2. The utility program causes certain bits to be set in the persistent registers 74 and/or in the strapping bits 76 that are used to configure the two UP CPU modules 14-1, 14-2 (i.e., as independent UP CPU modules or as a unitary DP CPU module). At step 162, the CPU modules 14-1, 14-2 are reset (or power cycled).

Upon starting up from a reset or a power cycle, each CPU module 14-1, 14-2 reads its own configuration flags (i.e., in persistent registers 74 and/or in strapping bits 76) to determine (step 166) that the CPU module is part of a DP CPU module configuration (described in FIG. 4). Each CPU module 14-1, 14-2 then enables and disables (step 170) various interfaces of the chipset (i.e., processor 50 and IOH device 58), as described above, to prepare to operate in the DP CPU module configuration.

For example, the bit values stored in the strapping bits can direct the MCH 72 of both CPU modules 14-1, 14-2 to enable its interface (i.e., port 80-2) for communicating over differential signal pairs 86. Each MCH 72 of the CPU modules 14-1, 14-2 can also instruct its corresponding IOH device 58 to enable its interface (i.e., port 92) for communicating over differential signal pairs 90. In addition, the MCH 72 of one of the two CPU modules (e.g., 14-2) can direct its IOH device 58 to disable its interface to the peripheral logic 62 (i.e., no communications over signal lines 94). Accordingly, upon starting up from a reset or a power cycle, the peripheral logic 62 of the CPU module 14-2, although present on the CPU module 14-2, remains hidden from the IOH device 58, and thus from the processor unit 50; and the processor unit 50, by reading certain register or strapping bits 74, 76, does not seek to execute boot code from the persistent memory 114—because, in one embodiment, such peripheral logic is hidden from the IOH device 58 (and/or other components of the CPU module). To conserve on power consumption, the unused peripheral logic 62 can be powered down or placed into a low-power standby mode.

After enabling and disabling the various interfaces, the CPU modules 14-1, 14-2 work together (step 174) as a unitary DP CPU module 14'. Accordingly, the upgrade occurs while the hardware (i.e., the CPU modules and I/O modules) remain in place, although there is momentary disruption of access to the I/O modules 18 when the CPU modules are reset or power cycled for reconfiguration.

Figure 6:
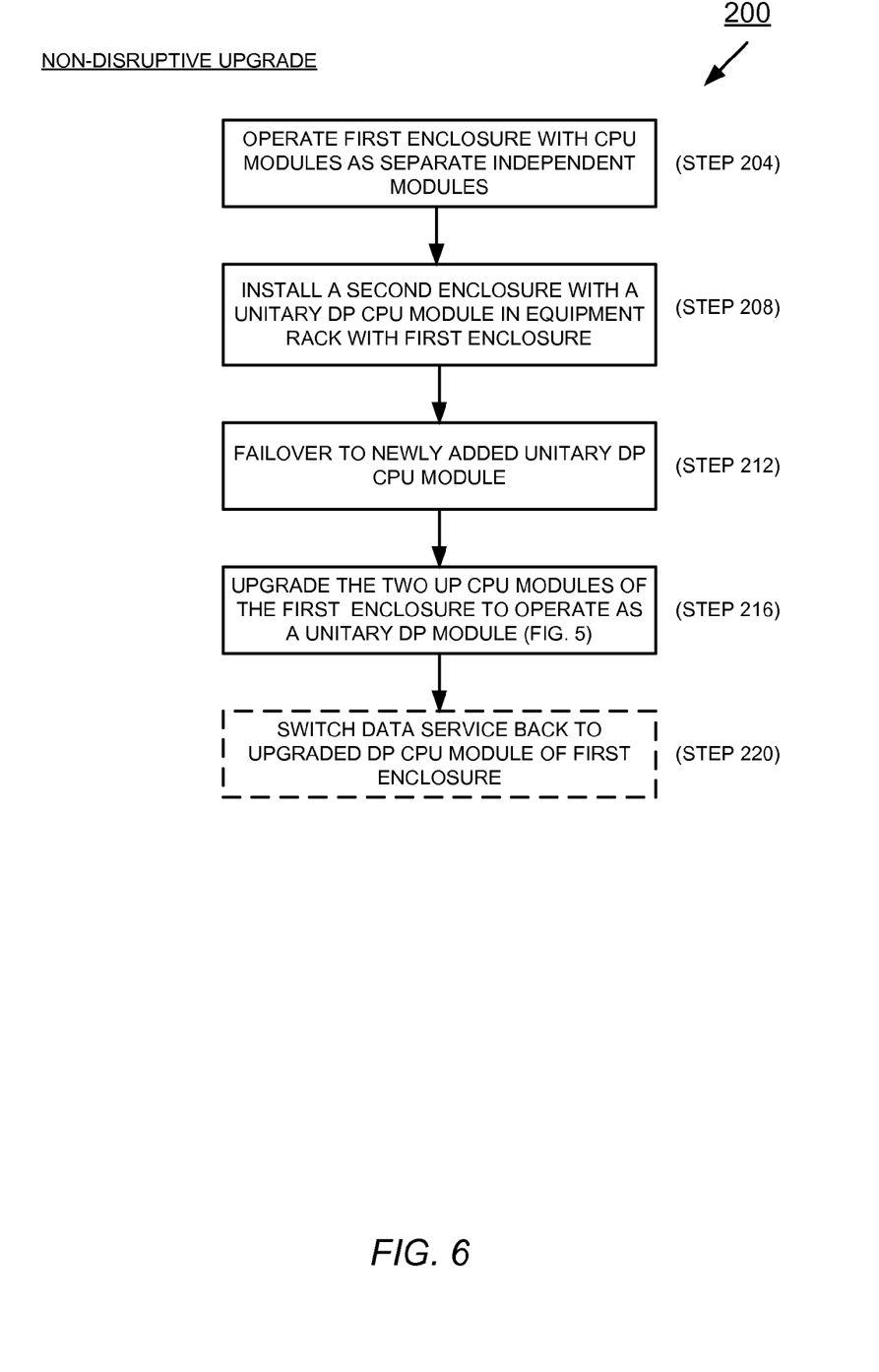
FIG. 6 is a flow diagram of an embodiment of a process for performing an in situ non-disruptive upgrade of an electronics system in accordance with the invention.

FIG. 6 shows an embodiment of a process 200 for performing a "non-disruptive" upgrade of an entry-level electronics system to a high-level electronics system in accordance with the invention. At step 204, a first electronics enclosure operates according to the first configuration, as described in FIG. 3: the electronics enclosure has two UP CPU modules 14-1, 14-2, each functioning independently as a separate CPU module. At step 208, a second electronics enclosure is installed in the equipment rack with the first electronics enclosure. The CPU modules of this second electronics enclosure operate in accordance with the DP CPU module configuration of FIG. 4, that is, as a unitary dual-processor CPU module.

After the second electronics enclosure is appropriately installed and operating in conjunction with the first electronics enclosure, the customer or field-service personnel performs (step 212) a failover operation: data are copied from the I/O modules of the first electronics enclosure to the I/O modules of the second electronics enclosure, and access to the stored data occurs through the DP CPU module of the second electronics enclosure. The CPU modules of the first electronics enclosure thus become available for non-disruptive, in situ upgrading.

While the second electronics enclosure supports access requests to the I/O modules 18, the customer or field-service personnel upgrades (step 216) the two UP CPU modules of the first electronics enclosure as described in connection with FIG. 5. Consequently, the two UP CPU modules of the first electronics enclosure begin to cooperate as a unitary DP CPU module. Data service can subsequently switch back (step 220) to the upgraded unitary DP CPU module of the first electronics enclosure. After the upgrade, the two electronics enclosures now provide a high-end electronics system having two independently operating DP CPU modules (each of which are housed within a single electronics enclosure and includes two UP CPU modules configured to work together as a unitary CPU module).

The upgrade occurs non-disruptively because the installation of the second electronics enclosure (and subsequent transfer of data) ensures that data remained available to external applications during the downtime of the CPU modules of the first electronics enclosure. The upgrade also occurs in situ because it does not require the removal and replacement of the first electronics enclosure or of any CPU module in the first electronics enclosure.

Although the previous description of the invention has been shown and described with specific reference to CPU modules having only one processor (i.e., processor 50), it is to be understood that the "basic building block" can have two or more processors (e.g., two or more of ensample processors such as processor 50). For example, the basic building block CPU module can be a dual-processor (e.g., two processors 50 in the building block CPU module 14). Accordingly, an entry-level system can be one with two independently operating CPU modules, each being a DP CPU module because each has two processors 50. Upgrading such an entry-level system to a high-level system by reconfiguring the two DP CPU modules to operate as a unitary CPU module produces a multiprocessor CPU module (i.e., with four processors 50). The present invention is scalable, particularly because the number of processors in a CPU module building block can be increased without departing from the principles of the invention.

In addition, the principles of the invention extend to having more than two CPU Modules in an electronics enclosure. For example, an electronics enclosure can have four UP CPU modules that combine to form a 4-way unitary CPU Module. This type of electronics enclosure would have more connections (e.g., CSI) on the midplane than enclosures with two CPU modules, to crisscross connect the various processors to each other.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. An electronics enclosure, comprising:
   I/O (input/output) modules;
   a midplane; and
   first and second field-replaceable CPU (central processing unit) modules in communication with the I/O modules through the midplane, each CPU module being independently pluggable into and removable from the midplane, each CPU module being configurable into either one of a first configuration and a second configuration, wherein the CPU modules operate independently as separate CPU modules when configured according to the first configuration and cooperate as a unitary CPU module when configured according to the second configuration.

2. The electronics enclosure of claim 1, wherein each CPU module includes a processor and the midplane has electrical connections over which the processors of the CPU modules can communicate with each other using serialized differential signaling.

3. The electronics enclosure of claim 2, wherein the CPU modules disable communications between the processors over the midplane when the CPU modules operate according to the first configuration and enable communications between the processors over the midplane when the CPU modules operate according to the second configuration.

4. The electronics enclosure of claim 3, wherein each CPU module includes an input-output hub (IOH) device for providing a communications interface between the I/O modules and the processor of that CPU module, and the midplane has electrical connections over which the IOH devices of the CPU modules can communicate with each other using serialized differential signaling.

5. The electronics enclosure of claim 4, wherein the CPU modules disable communications between the IOH devices when the CPU modules operate according to the first configuration and enable communications between the IOH devices when the CPU modules operate according to the second configuration.

6. The electronics enclosure of claim 1, wherein each CPU module includes peripheral logic, and wherein such peripheral logic is activated for one of the CPU modules and deactivated for the other of the CPU modules when the CPU modules are operating according to the second configuration.

7. The electronics enclosure of claim 1, further comprising a plurality of I/O modules; and wherein each CPU module communicates with a different subset of the I/O modules through the midplane when the CPU modules are operating according to the first configuration and each CPU module can communicate with any of the I/O modules through the midplane when the CPU modules are operating according to the second configuration.

8. A method for performing an upgrade to an electronics system, the electronics system comprising an electronics enclosure with a midplane having two CPU modules removably connected thereto, the method comprising:
   configuring the CPU modules of the electronics enclosure to operate according to a first configuration in which each CPU module operates independently as a separate CPU module when communicating with I/O modules in the electronics enclosure; and
   reconfiguring each CPU module in situ within the electronics enclosure to operate according to a second configuration in which the CPU modules work together as a unitary CPU module when communicating with the I/O modules in the electronics enclosure.

9. The method of claim 8, wherein each CPU module includes a processor and the midplane has electrical connections over which the processors of the CPU modules can communicate with each other using serialized differential signaling, and further comprising the step of disabling communications between the processors over the midplane if the CPU modules are configured to operate according to the first configuration and enabling communications between the processors over the midplane if the CPU modules are configured to operate according to the second configuration.

10. The method of claim 9, wherein each CPU module includes an input-output hub (IOH) device for providing a communications interface between the I/O modules and the processor of that CPU module, and the midplane has electrical connections over which the IOH devices of the CPU modules can communicate with each other using serialized differential signaling, and further comprising the step of disabling communications between the IOH devices when the CPU modules are configured to operate according to the first configuration and enabling communications between the IOH devices when the CPU modules are reconfigured to operate according to the second configuration.

11. The method of claim 8, wherein each CPU module includes peripheral logic, and further comprising the step of activating the peripheral logic for one of the CPU modules and deactivating for the other of the CPU modules when the CPU modules are reconfigured to operate according to the second configuration.

12. The method of claim 8, wherein the step of reconfiguring includes setting one or more configuration flags in each CPU module; resetting each CPU module; and reading the one or more configuration flags during start-up from the reset to establish that the CPU module is being reconfigured to operate in the second configuration.

13. The method of claim 8, wherein the electronics enclosure is a first electronics enclosure in an equipment rack, and further comprising the steps of:

providing a second electronics enclosure in the equipment rack, the second electronics enclosure having a midplane and two CPU modules removably plugged thereto, the CPU modules of the second electronics enclosure being configured to operate as a unitary CPU module; and performing a failover operation to the CPU modules of the second electronics enclosure before reconfiguring the CPU modules of the first electronics enclosure.

14. A logic chipset comprising:

a processor having a processing core in communication with a memory controller hub (MCH) device, the MCH device having a port for communicating with an MCH device of another processor over differential signal pairs in accordance with a serial interconnect protocol, the MCH device disabling communications through the port when configured according to a first configuration and enabling communications through the port when configured according to a second configuration.

15. The logic chipset of claim 14, further comprising an I/O hub device in communication with the processor over a set of differential signal pairs, the I/O hub device providing an interface to I/O modules, the I/O hub device having a port for communicating with another I/O hub device over differential signal pairs in accordance with the serial interconnect protocol, the I/O hub device disabling communications through the port of the I/O hub device when the MCH device is configured according to the first configuration and enabling communications through the port of the I/O hub device when the MCH device is configured according to the second configuration.

16. The logic chipset of claim 15, wherein the I/O hub device has a second port for communicating with peripheral logic, communications between the I/O hub device and the peripheral logic being enabled through the second port when the MCH device is configured according to the first configuration and being disabled through the second port, if the one of more bit values so indicates, when the MCH device is configured according to the second configuration, otherwise communications between the I/O hub device and the peripheral logic through the second port remains enabled when the MCH device is configured according to the second configuration.

17. The logic chipset of claim 14, further comprising one or more strapping bits used to determine the configuration of the MCH device.

18. The logic chipset of claim 14, further comprising a persistent register used to store one or more bit values that determine the configuration of the MCH device.

* * * * *